Patented June 29, 1926.

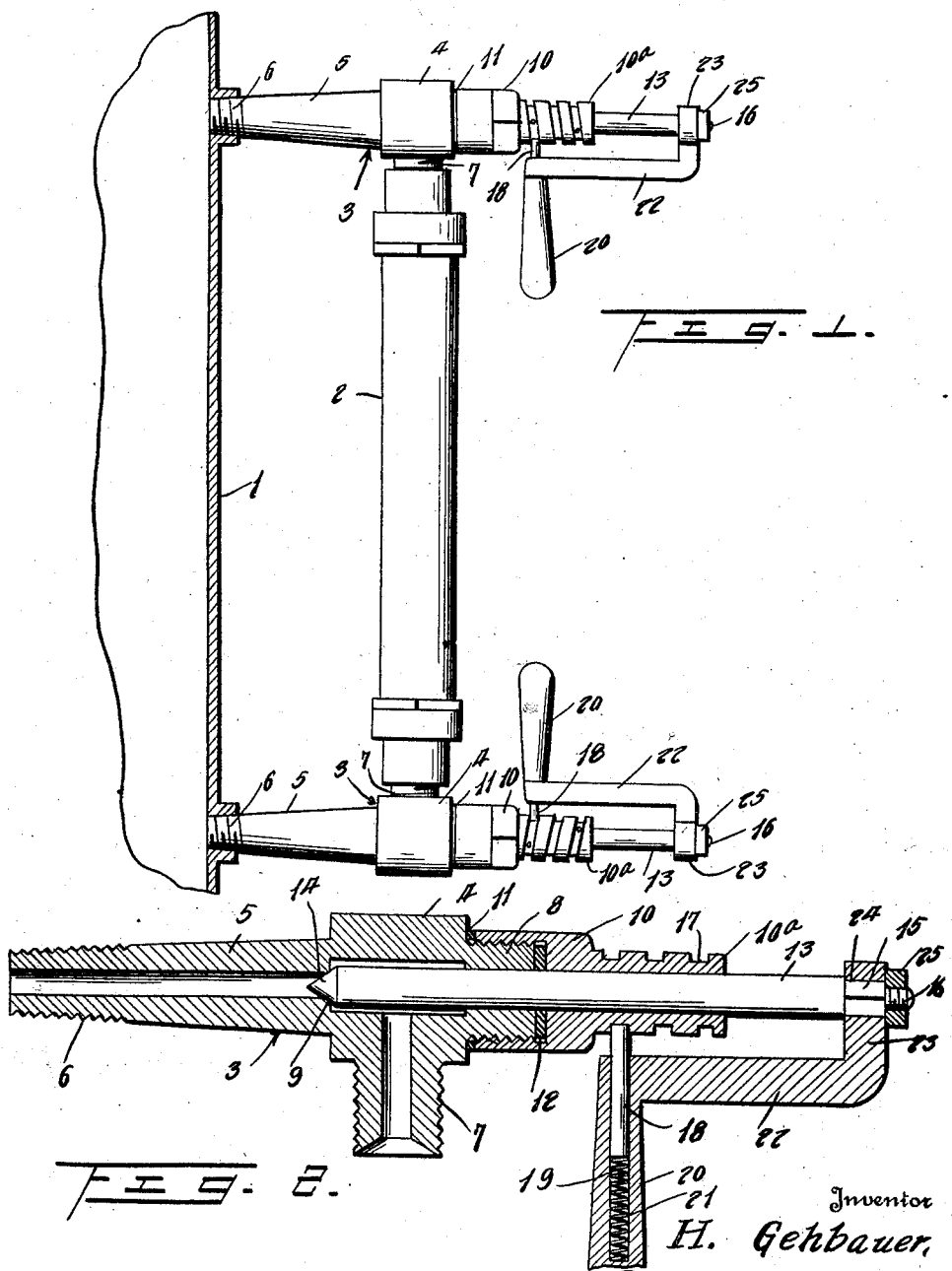

1,590,818

UNITED STATES PATENT OFFICE.

HENRY GEHBAUER, OF MARSHALL, TEXAS.

QUICK-OPENING WATER-GLASS VALVE.

Application filed July 9, 1925. Serial No. 42,499.

This invention has for one of its objects the provision of a novel, simple and inexpensive valve which while capable of general use shall be especially adapted for use in connecting gage glasses to steam boilers and which shall embody means by which it can be quickly opened or closed manually.

With the above and other objects in view, the invention consists of the construction, combination and arrangement of parts hereinafter fully described and claimed, and illustrated in the accompanying drawing, wherein:

Figure 1 is a view partly in vertical section and partly in elevation illustrating the application of valves embodying my invention, and Figure 2 is a sectional view taken on a vertical plane extending longitudinally and centrally through the valve.

Corresponding and like parts are referred to in the following description and designated in the accompanying drawing by similar reference characters.

In the drawing 1 designates a fragmentary portion of a steam boiler and 2 a gage glass connected to the boiler by valves 3 embodying my invention.

Each valve comprises a body 4, a stem 5 extending axially from one end of the body 4 and threaded as at 6 for connection with the boiler 1, a threaded nipple 7 extending laterally from the body 4 and a threaded hollow boss 8 extending axially from the other end of the body 4. At the juncture of the body 4 and stem 5 the valve is provided with a seat 9. A cap nut 10 provided with a sleeve $10^a$ is threaded on the boss 8, and a packing ring 11 is positioned between the inner end of the cap nut 10 and the body 4 and a packing washer 12 between the cap nut and the outer end of the boss 8. A stem 13 is slidably and rotatably mounted in the boss 8 and sleeve $10^a$ and is provided with a conical inner end 14 and a polygonal outer end 15 from which latter end extends a threaded stud 16. In its outer side the sleeve $10^a$ is provided with a quick acting spiral groove 17 in which is positioned the inner end of a pin 18 slidably mounted in the bore 19 of a handle 20. The pin 18 and handle 20 are arranged axially or radially with respect to the sleeve $10^a$ and the stem 13, and the pin 18 is held in the groove 17 by a spring 21 positioned between the inner end of the pin and the inner end wall of the bore 19. At its inner end the handle 20 is provided with an arm 22 arranged at right angles with respect thereto and in parallel relation with respect to the sleeve $10^a$ and stem 13. The arm 22 is provided at its outer end with an angular ear or lug 23 provided with a polygonal opening 24 for the reception of the polygonal end 15 of the stem 13. A nut 25 applied to the stud 16 retains the handle 20 on the stem 13.

In practice the valves 3 are secured to the boiler 1 and the gage glass 2 to the nipples 7 in the manner illustrated in Figure 1. When it is desired to either open or close the valves 3 the handles 20 are swung about the sleeves $10^a$ in the required direction. As the pins 18 engage in the grooves 17 the swinging movement of the handles 20 will either cause the stems 13 to move in the direction of or away from the seats 9, and as the grooves 17 are of a quick acting type the stems 13 will have imparted thereto a rapid endwise movement with the result that the valves can be quickly closed or opened. The packing disks 12 establish leak proof connections between the stems 13 and the bodies 4.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A valve comprising a body provided with a seat, a sleeve connected to the body and provided with an external spiral groove, a stem slidably and rotatably mounted in the body and sleeve, an arm arranged parallel to the stem and secured at its outer end to the outer end thereof, a handle secured to the inner end of the arm, and a spring pressed pin carried by the handle and engaging in said spiral groove.

2. A valve comprising a body provided with a seat and an external spiral groove, a stem mounted in the body for movement onto and off of said seat, an operating member secured to the stem, and a spring pressed pin carried by the operating member and engaging in the spiral groove.

3. A valve comprising a body provided with a seat and an external spiral groove, a stem mounted in the body for movement onto and off of the seat, a member secured to the stem, a pin carried by the member and movable into and out of the spiral groove, and an element adapted to hold the pin in engagement with the spiral groove.

In testimony whereof I affix my signature.

HENRY GEHBAUER.